Patented Mar. 27, 1928.

1,663,818

UNITED STATES PATENT OFFICE.

LÉOPOLD RUZICKA, OF GENEVA, SWITZERLAND, ASSIGNOR TO M. NAEF AND CIE., OF GENEVA, SWITZERLAND, A COMPANY OF SWITZERLAND.

PROCESS FOR THE MANUFACTURE OF FARNESOL.

No Drawing. Original application filed March 19, 1924, Serial No. 700,440, and in Switzerland March 22, 1923. Divided and this application filed October 2, 1925. Serial No. 60,117.

This invention has for its object to provide an improved process for the manufacture of farnesol which is a sesqui-terpenic alcohol contained in a large number of essential oils. According to this improved process acid agents, such as for instance glacial acetic acid, are caused to react upon nerolidol.

The transformation of the nerolidol into farnesol may be represented by the following reaction:

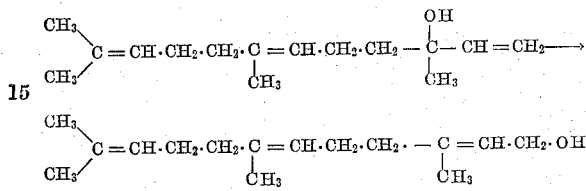

Farnesol may be employed as such as an odoriferous substance, or it may serve as the starting point for the preparation of other perfumes.

Example.

1 part of nerolidol is heated with 1½ parts of glacial acetic acid for 20 hours at a temperature of 120–140° C. After having removed from the product of the reaction the excess of acetic acid by distillation under reduced pressure or treatment with water, the product is saponified by means of alcoholic potash, and then, after precipitation by means of water, and drying, it is heated with 1 part of phthallic acid anhydride at a temperature of 90° C. The phthallic ester of farnesol, precipitated by means of an acid from a solution produced by treating the product of the above described reaction with a dilute solution of caustic soda and after extracting with ether the parts that have not combined with the phthallic acid anhydride, is saponified by heating with an alcoholic or alkaline aqueous solution, and then the resulting farnesol is separated out by distillation.

Farnesol prepared by this process is a colourless oil boiling at 125° C. (0.5 mm.) of $$d\,{}^{20}_{\;4} = 0.8908 \text{ and } n\,{}^{20}_{\;D} = 1.4890,$$

having, when diluted, an agreeable and persistent odour of flowers.

Oxidized by chromic acid the so prepared farnesol yields a farnesal which can be converted into a semicarbazone identifiable by its melting point of 133° C. (M. Kerschbaum, Berichte der Deutsch. Chem. Gessell. vol. 46, page 1732).

The farnesol may also be separated out by direct fractional distillation of the converted and saponified product, instead of isolating it by means of phthallic acid anhydride.

This application is a division of my co-pending application Ser. No. 700,440 filed March 19, 1924.

I claim:

A process for the manufacture of farnesol consisting in causing glacial acetic acid to react upon nerolidol.

In testimony whereof I affix my signature.

LÉOPOLD RUZICKA.